Patented July 9, 1929.

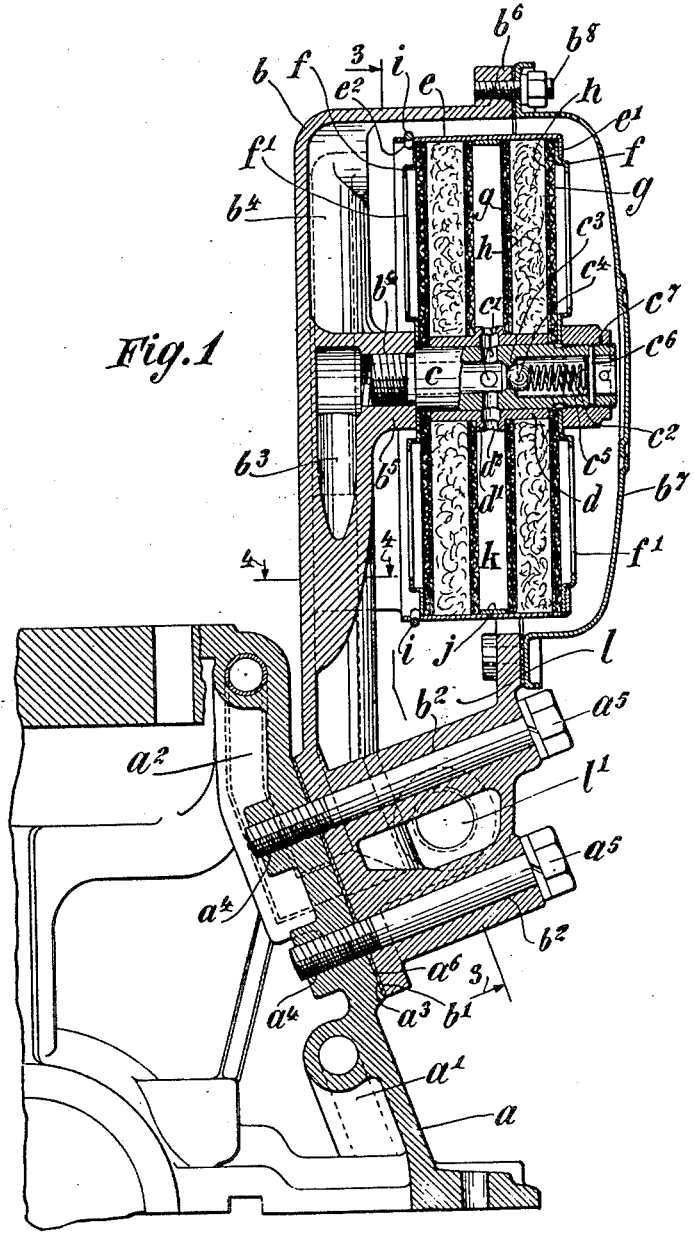

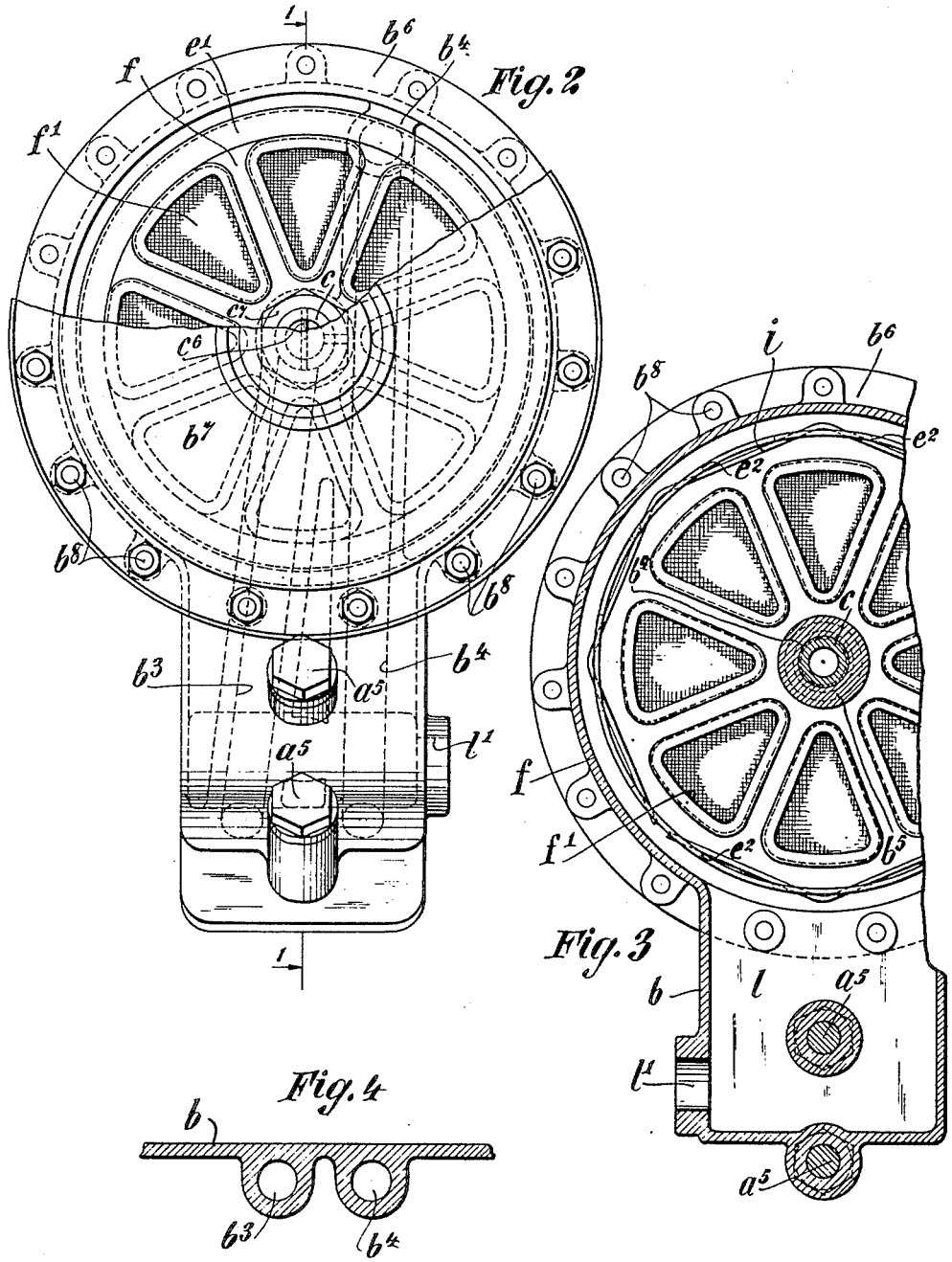

1,720,475

UNITED STATES PATENT OFFICE.

EDWARD R. HEWITT, OF MIDVALE, NEW JERSEY, ASSIGNOR TO INTERNATIONAL MOTOR COMPANY, OF NEW YORK, N. Y., A CORPORATION OF DELAWARE.

OIL FILTER.

Application filed February 9, 1928. Serial No. 252,994.

The present invention relates to devices for filtering or cleaning lubricating oil which is supplied to engine bearings. Although the construction set forth herein is applicable to any mechanism in which a continuous source of lubricant is supplied for the bearings, it has been designed for use particularly with motor cars. One of the great problems of lubrication in automotive vehicles is that of cleaning and purifying the oil which collects after lubricating the bearings of the engine. Various requirements such as infallibility of operation and smallness in size have caused oil filters of the above character to be inadequate for all phases of motor vehicle performance.

This invention provides an oil filter which is compact, easily mounted and dismounted, easily taken down and assembled, and is highly effective in purifying the oil. Being mounted in series with the pump and bearings, the oil passes through the filter under the pressure exerted by the pump and is applied directly to the bearings from the filter under the same pressure. In this manner, all of the oil used passes through the filter and a maximum degree of purification of oil supplied to the bearings is obtained.

A further object of the invention is to provide a filter which has a safety mechanism to allow the oil to by-pass the filtering elements in the event that such elements become clogged and obstruct the flow of the lubricant. The bearings are thus supplied with lubricant at all times and a maximum degree of protection is afforded. Other objects and advantages in features of design will be apparent as the description of the invention proceeds and reference will now be had to the accompanying drawings, wherein:

Figure 1 is a side elevation in section taken on line 1—1 of Figure 2 and looking in the direction of the arrows.

Figure 2 is a front elevational view, partly broken away, of the device shown in Figure 1.

Figure 3 is a view, in section, taken on line 3—3 of Figure 1, and looking in the direction of the arrows.

Figure 4 is a view, in section, taken on line 4—4 of Figure 1 and looking in the direction of the arrows.

Referring particularly to Figure 1, $a$ indicates the crank case of an internal combustion engine which carries an oil pump of the usual character, not shown herein, and $a'$ is the conduit leading from the oil pump into which the latter discharges the lubricant under pressure. From a second conduit $a^2$, formed likewise in the crank case, the lubricant is carried to the several bearings to which it is desired to supply the purified oil.

Formed on the outer surface of the crank case $a$, is a flat surface $a^3$ to which is secured the oil filter described hereinafter. Bolt holes $a^4$ in the walls of the crank case $a$ receive securing bolts $a^5$ which pass through the lower portion of the oil filter and secure the latter to the flat surface $a^3$ of the crank case.

Housing $b$ is formed with a flat mounting surface $b'$ which cooperates with the surface $a^3$ and bolt holes $b^2$ pass through the lower portion of the housing $b$ to receive the bolts $a^5$ and secure the housing to the crank case $a$. A suitable gasket $a^6$ seals the joint between the surfaces $a^3$ and $b'$. Formed in the rear wall of the housing $b$, are conduits $b^3$ and $b^4$, the former supplying lubricant to the filtering device and the latter carrying the lubricant away therefrom. As shown in dotted lines in Figure 2, these conduits lie in converging planes, the inlet conduit $b^3$ cooperating with the conduit $a'$ which carries lubricant from the pump, and the outlet conduit $b^4$ cooperating with the conduit $a^2$ in the crank case which carries the lubricant to the bearings.

The inlet conduit $b^3$ communicates with an aperture $b^9$, formed in a hub $b^5$. A hollow shaft section $c$ is threaded into the hub and is provided with centrally disposed transverse apertures $c'$. The lubricant is forced, under pressure of the pump, through the hollow shaft section and is discharged from the apertures $c'$ into the filtering device to be described. As a safety precaution the outer end of the shaft section $c$ is formed with a longitudinal chamber $c^2$ having a communication with the hollow portion of the shaft section. An annular seat $c^3$ receives a ball check valve $c^4$ which is urged against the seat by spring $c^5$. The spring may be secured within the chamber by a pin $c^6$ or any other desired means. If the filtering device becomes clogged, the pressure of the spring $c^5$ will be overcome by the pressure of the lubricant within the shaft section $c$ and unseat the ball check $c^4$, permitting the lubricant to pass directly from the hollow shaft section $c$ to the discharge conduit $b^4$.

A spacing sleeve $d$ is carried by the shaft $c$ and provided with an annular raised portion $d'$ provided with apertures $d^2$ which cooperate with the apertures $c'$ in the shaft $c$. The filtering mechanism includes a cylindrical oil cleaner retainer $e$ formed with a transverse annular flange $e'$ at one end and a plurality of peripheral slots $e^2$ at the other end. Against the annular flange $e'$ is seated an end plate $f$ formed with a plurality of triangular apertures $f'$ to permit the oil to pass through the plate. This plate serves as a backing against which a coarse mesh screen $g$ is seated. Next to the coarse screen is a fine mesh screen $h$. Against the annular shoulder $d'$ a second coarse mesh screen $g$ abuts and serves as a backing for a second fine mesh screen $h$. In the space between the two fine mesh screens a quantity of wool waste is provided. The elements carried by the housing $e$ adjacent the outer end of the shaft section $c$ are duplicated at its inner end and spaced by the annular shoulder $d'$ and sleeve $d$ in a similar manner. The inner end plate $f$ is held in its assembled position by means of a wire spring $i$ which is bent to have portions lying within the peripheral slots $e^2$. Between the inner screen sections, a spacing ring $j$ is provided which is of the same width as the annular shoulder $d'$. Together these elements space the inner screen sections to provide an annular chamber $k$ into which oil is discharged from the apertures $d^2$. Being under a pressure within the annular chamber $k$, the oil is forced through the series of screens and wool waste on either side of the chamber and pass through the apertures in the end plates $f$. It then falls to the bottom of the chamber $l$ within the housing $b$ and when a sufficient quantity has collected, falls into the outlet conduit $b^4$ at the top of the chamber $l$. An opening $l'$, at the bottom of the housing $b$ is provided for cleaning any sediment which might collect from time to time at the bottom of the chamber $l$.

The housing $b$ is formed with a flange $b^6$ to which is secured a cover plate $b^7$ by means of suitable bolts $b^8$. A nut $c^7$ serves to clamp the screens, wool waste, end plates and retainer in assembled position.

It will be seen that the entire structure can be easily dismounted, or the filtering elements removed by simply removing the cover $b^7$ and nut $c^7$, after which the end plates, screens and associated structure may be removed in their proper order. The number of elements is comparatively few and the area of filtering medium large. By providing a relatively large chamber between the filtering elements and subjecting it to the pressure of the oil from the oil pump, a very effective filtering is obtained, and the serviceability of the mechanism greatly increased. It has been found that a screen of one-quarter mesh for the outer screen elements and of twenty mesh for the inner elements gives very satisfactory results. These factors as well as other arrangements in the design of the device, may be altered to suit the requirements of individual installations, and no limitation is to be placed upon the structure save as defined in the appended claims.

I claim as my invention:

1. An oil filter comprising a housing, means to mount a plurality of filtering means within the housing to form a damper surrounding them, a second chamber formed between the filtering means, a supply line, means to connect the second-named chamber with the supply line through the axis of the filtering means, means communicating with the second-named chamber to permit oil to escape without being filtered from between the filters to the first-named chamber upon a predetermined pressure of the oil in the chamber, and a discharge line communicating with the housing.

2. An oil filter comprising a housing, a hub formed therein, a hollow shaft section secured to the hub, a supply line communicating with the shaft section through the hub, a spacing sleeve mounted over the shaft section and having an intermediate shoulder portion, means to secure screens adjacent either side of the shoulder portion and at the ends of the sleeve, a porous material between the screens on either side of the shoulder, means to connect the interior of the shaft section with the space between the pairs of screens, a cylindrical housing securing the screens in place, and a discharge line communicating with the interior of the first named housing.

3. An oil filter comprising a housing, a hub formed therein, a hollow shaft section secured to the hub, a supply line communicating with the shaft section through the hub, a spacing sleeve mounted over the shaft section and having an intermediate shoulder portion, means to secure screens adjacent either side of the shoulder portion and at the ends of the sleeve, a porous material between the screens on either side of the shoulder, means to connect the interior of the shaft section with the space between the pairs of screens, apertured end plates abutting the outer screens and mounted on the shaft section, a cylindrical housing securing the screens in place, and a discharge line communicating with the interior of the first named housing.

4. An oil filter comprising a housing, a hub formed therein, a hollow shaft section secured to the hub, a supply line communicating with the shaft section through the hub, a spacing sleeve mounted over the shaft section and having an intermediate shoulder portion, means to secure a pair of screens adjacent either side of the shoulder portion and at the ends of the sleeve, the inner screens of the two pairs on either side of the sleeve being of a smaller mesh than the outer screens, a porous material between the screens on either side of the shoulder, means to connect the interior of the shaft section with the space between the pairs of screens, a cylindrical housing securing the screens in place, and a discharge line communicating with the interior of the first named housing.

5. An oil filter comprising a housing, a hollow shaft mounted in one side thereof, two filtering means on the shaft, said filtering means being spaced from the housing to form a chamber between them and the housing, an oil inlet to the interior of the shaft, means cooperating with the filtering means to form a chamber therebetween, an oil outlet in the shaft to admit oil to the second-named chamber, and an automatic relief valve in the shaft to permit oil to leave the first-named chamber and enter the second-named chamber without passing through the filters, upon a predetermined oil pressure.

This specification signed this 1st day of February A. D. 1928.

EDWARD R. HEWITT.